United States Patent [19]

Tarbouriech

[11] Patent Number: 4,727,570
[45] Date of Patent: Feb. 23, 1988

[54] WAVEFORM GENERATORS
[75] Inventor: Jean-Claude Tarbouriech, Ville-La-Grand, France
[73] Assignee: Motorola, Inc., Schaumburg, Ill.
[21] Appl. No.: 866,838
[22] Filed: May 27, 1986
[30] Foreign Application Priority Data Jul. 9, 1985 [GB] United Kingdom ............... 8517370

[51] Int. Cl.$^4$ ........................................... H04M 1/26
[52] U.S. Cl. ................................. 379/361; 379/418; 328/14; 328/27
[58] Field of Search ............ 379/361, 387, 418, 252, 379/253, 257; 328/27, 14; 84/1.19, 1.26; 364/721; 370/110.2; 307/261

[56] References Cited
U.S. PATENT DOCUMENTS

| | | | |
|---|---|---|---|
| 3,787,836 | 1/1974 | Hagelbarger | 379/361 |
| 3,941,942 | 3/1976 | Nash | 379/361 |
| 3,982,460 | 9/1976 | Obayashi et al. | 84/1.01 X |
| 4,132,871 | 1/1979 | Lake | 379/361 X |
| 4,142,184 | 2/1979 | Lake | 379/361 X |
| 4,185,532 | 1/1980 | Hiyoshi et al. | 84/1.26 |

Primary Examiner—James L. Dwyer
Attorney, Agent, or Firm—Michael D. Bingham

[57] ABSTRACT

A stepwise approximation of a sinewave is generated by inputting different values representing different points on the waveform from a ROM (6) to a step duration counter (5). At the end of each step, a step counter (7) is incremented causing the ROM to input the next value. An up/down counter (3) is also incremented at the end of each step and caused to count in the opposite direction after a preset number of steps. The counter (3) produces an output representing the sinewave where the amplitude of all of the steps are equal but where their duration varies to produce the sinewave shape and this output is then passed to a D/A converter (9). An oscillator (1) is used to provide clock pulses to the step duration counter (5) and also to the up/down counter (3). Two such sinewave generators can be used in a dualtone multifrequency dialling circuit. The amplitude of one of the sinewaves can easily be varied by adjusting the step count so as to pre-emphasize one of the sinewaves and the two sinewaves are digitally mixed by the up/down counter.

27 Claims, 1 Drawing Figure

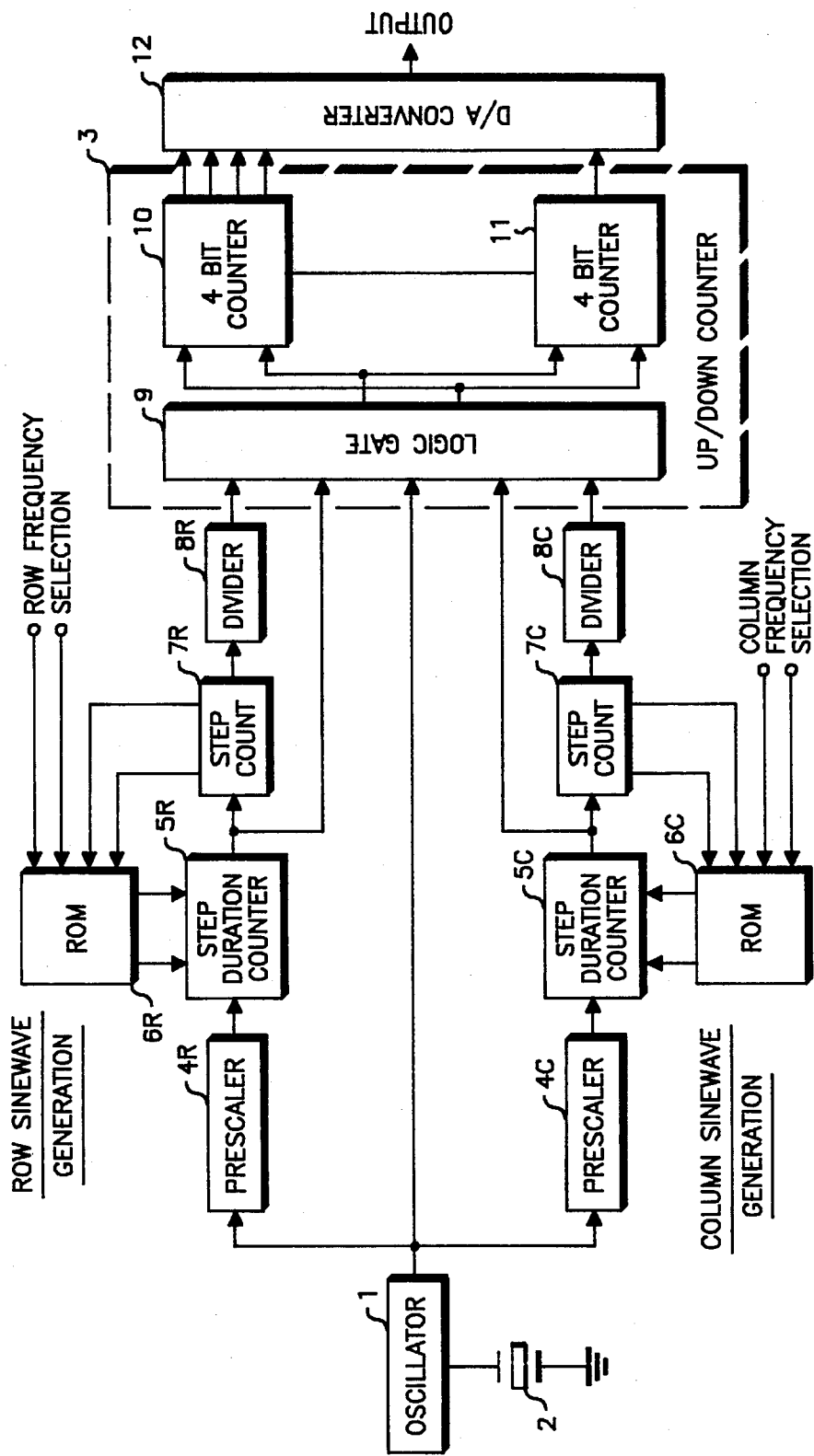

WAVEFORM GENERATORS

This invention relates to waveform generators and more particularly to a sinewave generator for use in a multitone telephone dialling circuit.

Originally, analog circuits were used for multitone dialling, but in recent years digital circuitry has been used in the generation of multitone frequencies. In U.S. Pat. No. 3,787,836, there is disclosed one such circuit which uses controlled frequency division, shifting, delaying and summation in suitable proportions to form approximations of the desired waveform. Such systems, however, require added filtering to remove the harmonics generated. The added filtering substantially increases the expense of manufacture.

In U.S. Pat. No. 3,941,942, there is disclosed a two of eight tone encoder utilising digital techniques to synthesize the dual tones of a Touch Tone telephone operator system. One of sixteen switches from the telephone keyboard selects one of four desired row tones and one of four desired column tones. Each of the two sinewaves are synthesized using an up-down counter and a set of eight resistors which are switched in turn into a resistive divider network and produce a stepped approximation to a sinewave. The two sinewaves so produced are filtered and provided as inputs to a summation amplifier whose output produces the desired tone having the frequency components for both the selected row input and the selected column input.

A different method of synthesizing a digital sinewave is disclosed in U.S. Pat. No. 4,142,184, where amplitude information describing each of the eight different frequencies is digitally encoded into a sequence of multibit words describing the amplitude at successive points along the waveform. The data words are stored in two solid state read-only memories, one for each set of four upper or lower frequencies, and the words for one upper and one lower frequency are read out in time synchronisation, added, and their sum used to synthesize an approximation of a multitone dialling waveform.

One disadvantage of the above digital methods of generating sinewaves is that in order to produce a reasonably accurate waveform, a high frequency quartz oscillator is required and these are fairly expensive and consume a lot of power. Furthermore a considerable amount of low order harmonics are present which are difficult to filter out.

In dualtone multifrequency generators for telephone dialling in which the higher frequency sinewave has been pre-emphasized, it has hitherto been necessary to provide two D/A converters, one for each of the sinewaves, and a summing amplifier to pre-emphasize the higher frequency sinewave and to mix the two sinewaves together.

It is therefore an object of the present invention to generate digitally waveforms which have very little low order harmonic content and which do not require a very high frequency oscillator.

Accordingly, the invention provides a waveform generator for synthesizing a waveform by stepwise approximation, comprising programmable means for providing a signal representing the duration of each of a series of steps forming the waveform, and an up/down counter coupled to said programmable means so as to provide an output voltage whose amplitude is incremented by a single predetermined value at the end of the duration of each step in response to the said signal and whose output thus represents a waveform in stepwise approximation in which the amplitude of each step is constant but where the durations of the steps are varied.

By incremented it is also meant to include decremented, i.e. incremented by positive or negative values.

The programmable means preferably includes means for dividing the frequency of a basic signal, which may be provided by an oscillator, by different preset values. The programmable means may also include memory means for storing the different preset values which are passed to the divider means which may be a step duration counter.

The programmable means may include a step counter which is incremented every time the step duration counter finishes one step and which causes the next preset value to be passed from the memory means to the step duration counter. The step counter is preferably also used to cause the up/down counter to count in the opposite direction after a predetermined number of steps.

The output from the up/down counter is preferably passed to a D/A converter which produces an analogue representation of the waveform and which may then be filtered to smooth the shape of the waveform.

The waveform generator may also include a prescaler to divide the oscillator frequency before it is passed to the step duration counter.

In a preferred embodiment, the up/down counter is a synchronous 5-bit counter whose output is passed directly to the D/A converter which conveniently comprises a resistor ladder network which produces the analogue representation of the waveform.

Alternatively, the output from the up/down counter is first passed to a 5-bit register, which then passes it to the resistor ladder network.

The memory means preferably has several series of preset values stored in it, each series representing a different waveform and, conveniently, has an input so that one particular series can be chosen as desired.

In a preferred embodiment, two such waveform generators are used to generate sinewaves in a dualtone multifrequency telephone dialling circuit with the oscillator, the up/down counter and the D/A converter being common to both.

In one embodiment, the up/down counter may comprise logic gate means for combining the up/down outputs from the two generators, and a 5-bit counter, which may be composed of two 4-bit counters connected in series, to provide a 5-bit output which represents the composite waveform. If the waveform generators do not include prescalers, the up/down counter must be able to count by up to two steps at a time since the signals from the step duration counters may both be counting in the same direction at the same time.

Alternatively, means for delaying the signals from one of the waveform generators may be provided between the generator and the up/down counter so that the signals from one generator are passed to the up/down counter at a different clock pulse to the signals from the other generator.

For example, when prescalers are used between the oscillator and the step duration counter, the prescalers can be designed so as to provide outputs which are out of phase with each other. One step counter then increments only on even oscillator clock pulses and the other step counter on odd oscillator clock pulses so that they never increment at the same time. The counter need then only count by one step at a time.

In a preferred embodiment, for example, of a dualtone multifrequency telephone dialling circuit, each memory stores four different waveforms, one having high frequency sinewaves and the other having low frequency sinewaves, so that the number of different composite waveforms is sixteen. The high frequency sinewaves are conveniently pre-emphasized by adjusting the step count so as to provide a larger amplitude for the high frequency sinewaves than for the low frequency sinewaves.

The circuit is preferably manufactured in integrated form with the up/down counter being a 5-bit counter which can count by up to two steps so that the prescalers are not required.

The invention will now be more fully described by way of example with reference to the drawing which is a block diagram of a dualtone multifrequency telephone dialling circuit according to the invention.

In telephones using dualtone multifrequency signalling, dialling of a digit is performed by sending, on the line, a combination of two frequencies called Row and Column frequencies respectively. The resulting signal is the sum of two sinewaves and corresponds to one of sixteen keys activated from the telephone keyboard.

The drawing shows a circuit for telephone dialling, composed of two sinewave generators, one synthesizing Row frequencies and the other synthesizing column frequencies, the frequencies being selected at R and C respectively.

An oscillator 1 coupled to a 455 KHz ceramic resonator 2 produces clock pulses which are passed directly to a synchronous up/down counter 3. The oscillator 1 is common to both sinewave generators and its output is passed to each of the generators.

Only the Row frequency generator will be described in detail since the Column frequency generator is identical. Similar parts of each generator are referenced with the same numeral but suffixed R or C for the Row frequency generator and the Column frequency generator respectively.

In the Row frequency generator, the oscillator frequency is divided by a prescaler 4R and passed to a step duration counter 5R which counts down from a preset value set by a Read-only Memory 6R. When the counter 5R reaches zero, the following step counter 7R is incremented, a new address is sent to the ROM 6R and a new value is preset into the step duration counter 5R. The prescaler 4R is conveniently a standard circuit such as no. MC14013 manufactured by Motorola Inc. The step duration counter 5R may comprise two MC14526 circuits in series and the step counter 7R is preferably a further circuit no. MC14526, all manufactured by Motorola Inc.

Because of the symmetry in the sinewave shape, only one half of the shape needs to be stored in the ROM 6R. During one half of the period, the up/down counter 3 counts up, during the other half it counts down depending upon the state of a divide by two stage 8R which follows the step counter 7R.

The preset values stored in the ROM 6R are proportional to the duration of the steps at particular points in the waveform. Since the up/down counter is incremented by equal amounts the sinewave is synthesized in stepwise approximation where the duration of each step is modulated and their amplitudes are equal. A set of four different waveforms is stored in each ROM 6R, 6C thus providing a choice of sixteen different Row/Column frequency combinations for dualtone multifrequency dialing.

The synchronous up/down counter 3, which has inputs from the oscillator 1 and the step duration counters 5R and 5C from both generators produces an output which is the sum of the sinewaves produced by the two generators. A D/A converter 12 then converts this output into a piecewise constant output which is then smoothed by a low pass filter (not shown).

The two prescalers 4R and 4C are designed so that the step duration counters 5R and 5C never increment on the same oscillator clock pulse so that the up/down counter 3 only needs to be able to count by 0 or ±1.

The up/down counter 3, conveniently comprises a logic gate means 9 such as a dual expandable and/or invert gate, for example, that manufactured by Motorola Inc. under no. MC14506, which is used to combine the up/down inputs for the row and column frequencies, and two 4-bit counters 10, 11 such as no. MC14516 manufactured by Motorola Inc., connected in series to provide a 5 bit output.

The 5-bit output from the up/down counter 3 is then passed to the D/A converter 12 which comprises a R/2R ladder network whose output is an analogue representation of the combined waveform.

This provides the advantage that a following low-pass filter can be made of a single capacitor because the impedance of the ladder network is independent of output level.

Furthermore, by using a single 5 bit up-down counter and a single 5 bit D/A converter to add the two sinewaves digitally before converting to the waveform, the current consumption is reduced since a single 5 bit D/A convertor consumes less current than two separate 4 bit converters, as have been used hitherto.

Because the duration of each step making up the waveform is individually programmable with high resolution, the individual output sinewave symmetries are represented with high accuracy, thus drastically reducing the low harmonic content of the output. For the same reason, the sinewave period can be adjusted with higher accuracy than hitherto in spite of the lower clock frequencies thus compensating for the lower frequency stability of ceramic resonators. The advantages are that ceramic resonators are cheaper than quartz, which are currently used, and that because clock frequency is lower, power consumption is also lower. This is a valuable feature for a circuit which is powered from the telephone line current.

In an alternative embodiment, an encoder may be provided between the ROM and the step counter so that the same ROM address is selected for two values of the step counter symmetrical around the middle value. This is possible because of the further symmetry of the sinewave shape which makes it possible to store only one quarter of the total shape.

The present invention thus allows mixing of two sinewaves and pre-emphasis of the higher frequency sinewave in a dualtone multifrequency dialling circuit without the necessity for providing a summing amplifier and using only a single D/A converter.

It will be appreciated that although the invention has been described as being made up of a number of discrete circuits, it can, if desired, be made as a single integrated circuit. In this case, it is desirable to make the up/down counter able to count by up to two steps so that as explained above the prescalers are unnecessary. In this case the up/down counter can easily be made directly as a 5-bit counter so as to obviate the necessity for using two 4-bit counters.

I claim:

1. A waveform generator for synthesizing a waveform by stepwise approximation, comprising programmable means for providing a signal representing the duration of each of a series of steps forming the waveform, and an up/down counter coupled to said programmable means so as to provide an output voltage whose amplitude is incremented by a single predetermined value at the end of the duration of each step in response to the said signal and whose output thus represents a waveform in stepwise approximation in which the amplitude of each step is constant but where the durations of the steps are varied.

2. A waveform generator according to claim 1 wherein said programmable means includes means for dividing the frequency of a basic signal by different preset values to provide said signal.

3. A waveform generator according to claim 2 wherein said basic signal is provided by an oscillator.

4. A waveform generator according to claim 2 wherein said means for dividing the frequency of a basic signal comprises a programmable step duration counter.

5. A waveform generator according to claim 2 wherein said programmable means further includes memory means for storing said different preset values for programming the step duration counter.

6. A waveform generator according to claim 1 wherein said up/down counter is caused to count in the opposite direction after a predetermined number of steps.

7. A waveform generator according to claim 6 wherein said programmable means further includes a step counter which is incremented every time the step duration counter finishes one step and which then causes said memory means to input the next preset value to the step duration counter.

8. A waveform generator according to claim 7 wherein said step counter also causes the up/down counter to count in the opposite direction after a predetermined number of steps.

9. A waveform generator according to claim 1 wherein said means for providing an output voltage also comprises a D/A converter which converts the output from the up/down counter into an analogue representation of the waveform.

10. A waveform generator according to claim 1 wherein said up/down counter comprises a 5-bit counter.

11. A waveform generator according to claim 1 wherein said up/down counter comprises two 4-bit counters connected in series to provide a 5-bit output.

12. A waveform generator according to claim 10 wherein said D/A converter comprises a resistor ladder network which produces an analogue representation of the waveform.

13. A waveform generator according to claim 1 wherein said up/down counter is a 5-bit synchronous counter.

14. A waveform generator according to claim 1 wherein said D/A converter further includes a 5-bit register which receives the output from the up/down counter and passes it to the resistor ladder network.

15. A waveform generator according to claim 5 wherein said memory means has stored in it a plurality of said series of preset values, each series representing a different waveform.

16. A waveform generator according to claim 15 wherein said memory means has an input whereby one particular series of preset values representing a particular waveform can be chosen.

17. A waveform generator according to claim 9 further comprising a filter for smoothing the output waveform from the D/A converter.

18. A waveform generator according to claim 1 wherein the amplitude of output waveform can be altered by varying the step count.

19. A waveform generator according to claim 1 wherein said output waveform is a sinewave.

20. A dualtone multifrequency telephone dialling circuit incorporating two waveform generators according to claim 19.

21. A dualtone multifrequency telephone dialling circuit according to claim 20 wherein said means for providing an output voltage is common to both waveform generators.

22. A dualtone multifrequency telephone dialling circuit according to claim 21 wherein a single oscillator is used to provide said basic signal to both waveform generators.

23. A dualtone multifrequency telephone dialling circuit according to claim 21 wherein the up/down counter adds the sinewaves from both generators and produces an output which represents the composite waveform.

24. A dualtone multifrequency telephone dialling circuit according to claim 23 wherein the up/down counter further comprises logic gate means which combines the up/down outputs from the two generators and passes the output to the 5-bit counter.

25. A dualtone multifrequency telephone dialling circuit according to claim 20 further comprising means for delaying the signals from one of the waveform generators by a predetermined time so that the signals from one of the generators are passed to the up/down counter at a different clock pulse to the signals from the other generator.

26. A dualtone multifrequency telephone dialling circuit according to claim 20 having two waveform generators each with a memory means having a plurality of series of preset values stored therein, wherein said series in one memory means represents relatively high frequency waveforms and said series in the second memory means represents relatively low frequency waveforms.

27. A dualtone multifrequency telephone dialling circuit according to claim 20 which is constructed in integrated form.

* * * * *